UNITED STATES PATENT OFFICE.

CHARLES A. BECKER, OF NEWARK, NEW JERSEY.

PROCESS OF SOLDERING CHAIN.

1,081,088.

Specification of Letters Patent.

Patented Dec. 9, 1913.

No Drawing. Application filed September 18, 1913. Serial No. 790,451.

*To all whom it may concern:*

Be it known that I, CHARLES A. BECKER, a citizen of the United States, and a resident of Newark, in the county of Essex and State of New Jersey, have invented certain Improvements in Processes of Soldering Chain, of which the following is a specification.

This invention relates to the soldering of chain made from solder wire or wire having a core of solder, and the objects of the invention are to secure a perfect union of the ends of the wire in each link, without connection to the next adjacent link by escaping solder; to prevent beads of solder on the outer surface of the links or chain; to secure a strong chain of clean appearance; to do this with minimum time and labor, and to obtain other advantages and results as may be brought out in the following description.

In carrying out my invention, chain formed from solder wire in the well-known chain-making machines, which bend the links and connect them together with their joints between the ends of the wire simply pressed together, is treated with a solution of borax or other soldering salt or flux, as by boiling it in such a solution, and dried, so that the chain is coated with crystals of the soldering salt or flux. The chain is then heated, either in a machine similar to a soldering machine or in any other suitable manner, but only to such a degree of heat as will melt or fuse the soldering salt or flux upon the chain, without causing the solder in the wire of which the links are composed to run or soften for joining. This causes the soldering salt or flux to become evenly distributed over the joint surfaces, either by running into a joint where there is not enough or by running out of a joint where there is too much, and after being thus heated the chain is rubbed or subjected to mechanical means for removing surplus soldering salt or flux, principally from the outer surface of the links, though perhaps incidentally affecting the soldering salt or flux between the joint surfaces or ends of the wire of each link. After this treatment for the removal of surplus soldering salt or flux, the chain is run through a soldering flame or otherwise heated to close the joints by causing the solder to run or soften, as will be understood by those skilled in the art. It should be noted that when this closing is done the joint surfaces of the links are coated with soldering salt or flux while the rest of the surface of the links is devoid of soldering salt or flux. Furthermore, the coating on the joint surfaces is uniform and even, and not too heavy, because all surplus soldering salt or flux has been melted out by the preliminary heating. I thus secure a very clean and perfect closure of the links.

Preferably the chain is rubbed with sawdust or other granular material to remove the soldering salt or flux as described, and one advantage of my improved process is that this rubbing can be very vigorous and effective because the fused soldering salt or flux affords more or less connection between the ends of the links. The soldering salt or flux upon the other surfaces of the chain can thus be removed perfectly and quickly without detriment to the joints.

While I have described the borax or other soldering salt or flux as first applied to the chain by boiling the chain in a solution of it, I do not wish to restrict myself to this method of applying, since obviously it could be applied in any other suitable manner. Furthermore, the chain as soon as it is soldered is preferably bent or given a zig-zag motion to cause its links to swing one upon another and thus insure against any possible sticking or stiff-soldering, which motion may be imparted in any suitable and well-known manner.

Heretofore chain coated with crystals of soldering salt or flux has been rubbed or treated in any other suitable and well-known manner to remove the crystals from the links except at the joint surfaces, then heated to melt the borax in the joints, then the surplus salt or flux removed, and the chain soldered, but my improved process is not only simpler and saves a great deal of time in that the first rubbing is eliminated, but also by heating before any rubbing has taken place the joint surfaces are much better provided with the soldering salt or flux to be melted, it being practically impossible not to remove some from the joints by the first rubbing.

Having thus described the invention, what I claim is:

1. A process of soldering chain made from solder wire, consisting in applying a soldering salt or flux to the chain, subjecting the chain to heat sufficient to fuse the soldering salt or flux but insufficient to melt the solder, removing the soldering salt or flux from the surface of the chain other than the joint surfaces of the links, and closing the joints by heating the chain.

2. A process of soldering chain made from solder wire, consisting in applying a soldering salt or flux to the chain, subjecting the chain to heat sufficient to fuse the soldering salt or flux but insufficient to melt the solder, removing surplus soldering salt or flux, and closing the joints by heating the chain.

3. A process of soldering chain made from solder wire, consisting in applying a soldering salt or flux to the joints of the chain, subjecting the joints to heat sufficient to fuse the soldering salt or flux but insufficient to melt the solder, removing surplus soldering salt or flux, and closing the joints by heating them.

4. A process of soldering chain made from solder wire, consisting in applying a soldering salt or flux to the joints of the chain, subjecting the joints to heat sufficient to fuse the soldering salt or flux but insufficient to melt the solder, mechanically removing surplus soldering salt or flux, and closing the joints by heating them.

5. A process of soldering chain made from solder wire, consisting in applying a soldering salt or flux to the joints of the chain, subjecting the joints to heat sufficient to fuse the soldering salt or flux but insufficient to melt the solder, frictionally removing surplus soldering salt or flux with a granular substance, and closing the joints by melting them.

6. A process of soldering chain made from solder wire, consisting of applying a soldering salt or flux to the chain, subjecting the chain to heat sufficient to fuse the soldering salt or flux but insufficient to melt the solder, removing the soldering salt or flux from the surface of the chain other than the joint surfaces of the links, closing the joints by heating the chain, and imparting to the links a bending motion with respect to one another.

7. A process of soldering chain made from solder wire. consisting in applying a soldering salt or flux to the chain, subjecting the chain to heat sufficient to fuse the soldering salt or flux but insufficient to melt the solder, removing surplus soldering salt or flux, closing the joints by heating the chain, and imparting to the links a bending motion with respect to one another.

8. A process of soldering chain made from solder wire, consisting in applying a soldering salt or flux to the joints of the chain, subjecting the joints to heat sufficient to fuse the soldering salt or flux but insufficient to melt the solder, removing surplus soldering salt or flux, closing the joints by heating them, and imparting to the links a bending motion with respect to one another.

CHARLES A. BECKER.

Witnesses:
HOWARD P. KING,
JANET A. AYERS.

Copies of this patent may be obtained for five cents each, by addressing the "Commissioner of Patents, Washington, D. C."